US009042555B2

(12) United States Patent
Candelore et al.

(10) Patent No.: US 9,042,555 B2
(45) Date of Patent: May 26, 2015

(54) ON-DEMAND DOWNLOAD OF PARTIAL ENCRYPTED CONTENT FOR PARTIAL SUPER DISTRIBUTED CONTENT

(75) Inventors: Brant L. Candelore, San Diego, CA (US); Stephane Lejeune, San Diego, CA (US)

(73) Assignee: Sony Corporation, Tokyo (JP)

( * ) Notice: Subject to any disclaimer, the term of this patent is extended or adjusted under 35 U.S.C. 154(b) by 537 days.

(21) Appl. No.: 13/024,459

(22) Filed: Feb. 10, 2011

(65) Prior Publication Data

US 2012/0207306 A1  Aug. 16, 2012

(51) Int. Cl.
| | |
|---|---|
| G06F 21/00 | (2013.01) |
| H04L 29/08 | (2006.01) |
| H04N 21/2347 | (2011.01) |
| H04N 21/4405 | (2011.01) |
| H04N 21/472 | (2011.01) |
| H04L 29/06 | (2006.01) |

(52) U.S. Cl.
CPC ............... *H04L 67/06* (2013.01); *H04L 63/102* (2013.01); *H04N 21/23476* (2013.01); *H04N 21/4405* (2013.01); *H04N 21/47202* (2013.01); *H04L 67/10* (2013.01)

(58) Field of Classification Search
CPC .................. H04N 21/47202; H04N 21/23476; H04N 21/4405
USPC ................ 380/77–279; 713/100, 176; 705/59
See application file for complete search history.

(56) References Cited

U.S. PATENT DOCUMENTS

| | | | |
|---|---|---|---|
| 7,024,156 B2* | 4/2006 | Kawamata et al. ........... 455/3.02 |
| 7,249,105 B1* | 7/2007 | Peinado et al. ................ 705/56 |
| 7,257,309 B1* | 8/2007 | Elswick et al. ............... 386/200 |
| 7,263,187 B2 | 8/2007 | Pedlow, Jr. et al. | |
| 7,286,667 B1 | 10/2007 | Ryal | |
| 7,336,787 B2 | 2/2008 | Unger et al. | |
| 7,814,525 B2 | 10/2010 | Pedlow, Jr. et al. | |

(Continued)

FOREIGN PATENT DOCUMENTS

WO    2009038830    3/2009

OTHER PUBLICATIONS

Nair et, Enabling DRM-preserving digital content redistribution, IEEE, 2005,Seventh IEEE International Conference, pp. 151-158.*

(Continued)

*Primary Examiner* — Bradley Holder
*Assistant Examiner* — Ali Shayanfar
(74) *Attorney, Agent, or Firm* — Miller Patent Services; Jerry A. Miller

(57) ABSTRACT

A request to render content associated with a first super distributed content file is detected by a content rendering device. At least one portion of the content associated with the first super distributed content file is determined to be missing from the first super distributed content file. A second file including the at least one portion of the content missing from the first super distributed content file is obtained from a server. The at least one portion of the content of the second file includes partial encrypted portions of the content associated with an encryption system of the content rendering device. A content output stream including decrypted partial encrypted portions of the content of the second file and the content associated with the first super distributed content file is generated. This abstract is not to be considered limiting, since other embodiments may deviate from the features described in this abstract.

28 Claims, 5 Drawing Sheets

(56) References Cited

U.S. PATENT DOCUMENTS

| | | | |
|---|---|---|---|
| 7,929,698 B2* | 4/2011 | Candelore | 380/239 |
| 8,345,869 B2* | 1/2013 | Kahn et al. | 380/228 |
| 2002/0172368 A1* | 11/2002 | Peterka | 380/278 |
| 2002/0196939 A1 | 12/2002 | Unger et al. | |
| 2005/0192904 A1* | 9/2005 | Candelore | 705/51 |
| 2005/0229257 A1* | 10/2005 | Kim et al. | 726/27 |
| 2007/0038578 A1* | 2/2007 | Liu et al. | 705/62 |
| 2008/0199007 A1 | 8/2008 | Candelore | |

OTHER PUBLICATIONS

Androutsellis-Theotokis, A survey of peer-to-peer content distribution technologies, ACM Computing Surveys (CSUR) Surveys Homepagearchive, vol. 36 Issue 4, Dec. 2004, pp. 335-371.*

Author Unknown, McCormac Hack Over Cablemodem, McCormac's Hack Watch News, website/page: http://www.hackwatch.com/cablemodhack.html, Aug. 10, 1998, pp. 1-5, Hack Watch News, Published on the World Wide Web.

* cited by examiner

ON-DEMAND DOWNLOAD OF PARTIAL ENCRYPTED CONTENT FOR PARTIAL SUPER DISTRIBUTED CONTENT

CROSS REFERENCE TO RELATED DOCUMENTS

This application is related to U.S. Pat. No. 7,814,525 titled "NAVIGATION WITHIN SWITCHED DIGITAL STREAMED CONTENT," which was filed in the United States Patent and Trademark Office on Feb. 2, 2007, and is also related to U.S. Pat. No. 7,263,187 titled "BATCH MODE SESSION-BASED ENCRYPTION OF VIDEO ON DEMAND CONTENT," which was filed in the United States Patent and Trademark Office on Apr. 21, 2004, both of which are hereby both incorporated by reference in their entirety as if fully set forth herein.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the United States Patent and Trademark Office patent file or records, but otherwise reserves all copyright rights whatsoever. Trademarks are the property of their respective owners.

BACKGROUND

Conventional super distribution is a form of audio and/or video (A/V) content distribution that utilizes either server download capabilities (e.g. bit torrents, peer-to-peer, IPTV services, etc.) or package media (e.g., compact discs (CDs), digital video discs (DVDs), etc.) for distribution of A/V content to large volumes of consumers. Conventional super distribution may also be performed by preloading storage devices, such as universal serial bus (USB) devices, hard drives, and other types of storage media, with A/V content for high-volume distribution.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
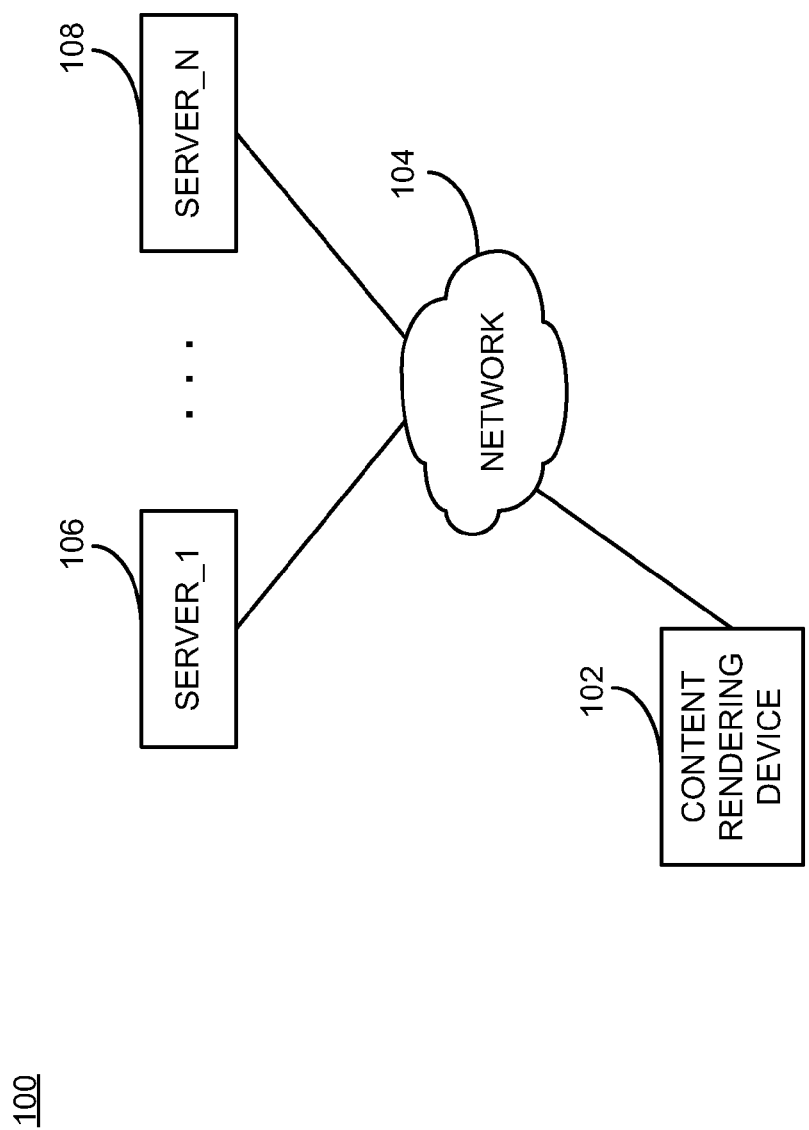
FIG. 1 is a block diagram an example of an implementation of a system capable of providing on-demand download of partial encrypted content for partial super distributed content consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

Acronyms, Abbreviations and Definitions

PID—Packet Identifier
RAM—Random Access Memory
SAN—Storage Area Network
Critical Packet—a packet or group of packets that, when encrypted, renders a portion of a video image difficult or impossible to view if not properly decrypted, or which renders a portion of audio difficult or impossible to hear if not properly decrypted. The term "critical" should not be interpreted as an absolute term, in that it may be possible to hack an elementary stream to overcome encryption of a "critical packet," but when subjected to normal decoding, the inability to fully or properly decode such a "critical packet" would inhibit normal viewing or listening of the program content.
Selective Encryption (or Partial Encryption)—encryption of only a portion of an elementary stream in order to render the stream difficult or impossible to use (i.e., view or hear).
Multiple Selective Encryption—encryption of portions of a single selection of content under two or more separate encryption systems.
Passage®—Registered Trademark of Sony Electronics Inc. for various single and multiple selective encryption systems, devices and processes.
Trick mode—an operational mode of playback of digital content to simulate fast forward, rewind, pause, suspend (stop), slow motion, etc. operations as in a video tape system.
The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system.

The term "program," as used herein, may also be used in a second context (the above definition being for the first context). In the second context, the term is used in the sense of a "television program." In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

The terms "scramble" and "encrypt" and variations thereof may be used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The Passage® initiative (Passage is a registered trademark of Sony Electronics Inc.), promoted by Sony, provides a mechanism for Multiple Service Operators (MSOs) to deploy non-legacy headend equipment, subscriber devices and services on their existing legacy networks. In the United States, these networks are most commonly supplied by either Motorola (formerly General Instrument) or Cisco (formerly Scientific Atlanta). These two companies at present constitute better than a 99% share of the US cable system market as turnkey system providers. The systems, by design, employ proprietary technology and interfaces precluding the introduction of non-incumbent equipment into the network. An MSO, once choosing one of these suppliers during conversion from an analog cable system to a digital cable system, faces a virtual monopoly when seeking suppliers for additional equipment as their subscriber base or service offering grows.

Before the Passage® initiative, the only exit from this situation was to forfeit the considerable capital investment already made with the incumbent provider, due to the intentional incompatibility of equipment between the incumbent and other sources. One primary barrier to interoperability is in the area of conditional access systems, the heart of addressable subscriber management and revenue collection resources in a modern digital cable network.

The Passage® system technologies were developed to allow the independent coexistence of two or more conditional access systems on a single, common plant. Unlike other attempts to address the issue, the two systems operate with a common transport stream without any direct or indirect interaction between the conditional access systems. The basic processes used in these technologies are discussed in detail in the above-referenced pending patent applications.

The above-referenced commonly owned patent applications, and others such as U.S. Pat. No. 7,336,787 for "Critical Packet Partial Encryption" which is also hereby incorporated by reference, describe inventions relating to various aspects of methods generally referred to herein as partial encryption or selective encryption, consistent with certain aspects of Passage®. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is consumed to effectively encrypt the content using multiple encryption systems.

In each of these disclosures, the clear content is identified using a primary Packet Identifier (PID). A secondary PID (or shadow PID) is also assigned to the program content. Selected portions of the content are encrypted under two (or more) encryption systems and the encrypted content is transmitted using both the primary and secondary PIDs (one PID or set of PIDs for each encryption system). The so-called legacy STBs operate in a normal manner decrypting encrypted packets arriving under the primary PID and ignoring secondary PIDs. The newer (non-legacy) STBs operate by associating both the primary and secondary PIDs with a single program. Packets with a primary PID are decoded normally and packets with a secondary PID are first decrypted then decoded. The packets associated with both PIDs are then assembled together to make up a single program stream. The PID values associated with the packets are generally remapped to a single PID value for decoding (shadow PIDs remapped to the primary PID value or vice versa.)

The present subject matter provides automated on-demand download of partial encrypted content for partial super distributed content. For purposes of the present description, "partial super distributed content" may be considered content distributed via a conventional super distribution channel with at least a portion of the audio and/or video (A/V) content (hereinafter "content) missing from the distributed content file associated with a partial super distributed content medium. A "partial super distributed content medium" may include, for example, compact discs (CDs), digital video discs (DVDs), content that is downloaded and locally stored prior to rendering, preloaded storage devices, such as universal serial bus (USB) devices, hard drives, and other types of storage media, with at least a portion of the audio and/or video (A/V) content missing from the distribution medium. Further, "partial encrypted content" may include single partial encrypted content or multiple partial encrypted content as appropriate for a given implementation.

Based upon the present subject matter, content may be partially super distributed with portions of the content not included within (e.g., omitted from, missing from) a partial super distributed content file. In response to a determination that at least one portion of the content associated with the partial super distributed content file is missing, a content rendering device obtains (e.g., downloads) a second file that includes the portion(s) of the content that are missing from the partial super distributed content file and merges the two files to generate a content output stream to render the content. The portions missing from the partial super distributed content file may be downloaded in their entirety before starting to render the content or the portions may be retrieved in real-time as needed as the content is played out/rendered.

The portions of the content that are missing from the partial super distributed content file may be encrypted via one or more encryption systems and distributed on demand in encrypted form via the second file that includes the portions of the content that are not included within the partial super distributed content file. The second partial encrypted content file may include partial encrypted portions of the entire content that are encrypted under a single encryption system. Alternatively, the second partial encrypted content file may include multiple partial encrypted portions of the entire content that are encrypted under multiple encryption systems, where the content rendering device decrypts the portions of the multiple partial encrypted content associated with an encryption system accessible or associated with the content rendering device. As such, the content within the second partial encrypted content file may be considered partial encrypted content portions or multiple partial encrypted content portions of the content associated with the partial super distributed content file.

The examples within the present description include partial super distribution of partial encrypted content, where at least some of the portions of the content that are encrypted are omitted/missing from a partial super distributed content file stored on a partial super distribution medium or initially-downloaded content. The second partial encrypted content file represents the partial encrypted portions of the entire content that have been partitioned into the second partial encrypted content file for on-demand distribution. However, it is understood that other variations different from those described above and in more detail below are considered to be within the scope of the present subject matter. For example, partial encrypted content may be split into some proportion between a partial super distributed content file and a downloaded or otherwise accessible file without departure from the scope of the present subject matter.

The partial super distributed content may be distributed as a single file, either preloaded onto a recorded medium (e.g., compact discs (CDs), digital video discs (DVDs), universal serial bus (USB) drives, etc.), or downloaded from a server or a peer, and stored locally prior to rendering. Downloading of the partial super distributed content file may be performed on demand as part of a purchase, rental, lease, or other transaction.

The download of partial encrypted content portions of a content selection associated with a partial super distributed content file may be performed on demand (i.e., dynamically as needed, "on the fly") by accessing a server or other local or remote device that stores the partial encrypted portions of the partial super distributed content that may be decrypted by the particular content rendering device. Local devices may include a package medium or a portable memory storage medium accessible via the content rendering device (e.g., compact discs (CDs), digital video discs (DVDs), etc.), or a preloaded storage medium accessible via the content rendering device (e.g., preloaded universal serial bus (USB) drives, etc.). Remote devices may include one or more servers of the partial encrypted content, general web servers, or other remotely accessible devices (e.g. peer devices) that include a storage device from which the partial super distributed content file may be downloaded. Remote devices may be accessed via a home network or other network, wired or wireless, to access and download the particular partial encrypted content.

The partial encrypted content file may be downloaded or accessed from a recorded medium as a separate file. The download or access of the partial encrypted content file may be performed, for example, in response to detecting at a content rendering device, a request to render content associated with a super distributed content file. A determination may be made that at least one portion of the content associated with the super distributed content file is missing from the first super distributed content file. In response to such a determination, a second file may be obtained from a server including the at least one portion of the content that is missing from the first super distributed content file. The at least one portion of the content of the second file may include partial encrypted portions of the content associated with an encryption system of the content rendering device (e.g., Digital Rights Management (DRM), conditional access (CA), Secure Socket Layer (SSL), etc.). In some cases, link protection, such as SSL, may be sufficient to protect the second file provided the receiving device obeys certain compliance and robustness rules, as appropriate for a given implementation. It is understood that appropriate compliance and robustness rules may differ for any such implementation. A content output stream may be generated with decrypted partial encrypted portions of the content of the second file and the content associated with the first super distributed content file. Generation of the content output stream may include merging the content from the two files, either into a single one of the two files, into a new file, or dynamically into the content output stream. It is understood that portions of the second file may also be retrieved/obtained from a server and merged in association with rendering of the content.

It should further be noted that the partial encrypted portions of the content may be encrypted using one, or more than one, encryption key, respectively, that changes over time. In such an implementation, an encryption key associated with an encryption system or encryption system type of the content rendering device may be downloaded for use in association with generation of the content output stream. The downloaded encryption key may include an encryption key with a valid duration that expires after a specified period of time. As such, additional distribution of the partial encrypted content file may be limited by use of such an encryption key.

It should also be noted that the content associated with the partial super distributed content file may be encrypted using a coverage key. The coverage key may be an encryption key accessible by the content rendering device, either as a preloaded coverage key or downloaded. In such an implementation, the portions of the content within the partial super distributed content file that are encrypted with the coverage key may also be decrypted using the coverage key as a part of generation of the content output stream.

For purposes of the present description, the content portions that may be selectively (partially or multiply) encrypted for automated on-demand download of partial encrypted content for partial super distributed content may be considered "critical" packets, as described above. In accordance with certain embodiments consistent with the present subject matter, the selected portions of the content to be encrypted may be any individual one or combination of the following (described in greater detail in the above-referenced patent applications): video slice headers appearing in an active region of a video frame, data representing an active region of a video frame, data in a star pattern within the video frame, data representing scene changes, I Frame packets, packets containing motion vectors in a first P frame following an I Frame, packets having an intra_slice_flag indicator set, packets having an intra_slice indicator set, packets containing an intra_coded macroblock, data for a slice containing an intra-coded macroblock, data from a first macroblock following the video slice header, packets containing video slice headers, anchor data, and P Frame data for progressively refreshed video data, data arranged in vertical and or horizontal moat patterns on the video frame, and any other selected data that renders the video and/or audio difficult to utilize. Several such techniques as well as others are disclosed in the above-referenced patent applications, any of which (or other techniques) may be utilized with the present subject matter to encrypt only a portion of the content. As described above and in more detail below, one or more of these example critical packets may be used for automated on-demand download of partial encrypted content for partial super distributed content. Other fields are possible for multiple partial encryption for automated on-demand download of partial encrypted content for partial super distributed content and all are considered within the scope of the present subject matter.

The on-demand download of partial encrypted content for super distributed content described herein may be performed in real time to allow prompt rendering of partial super distributed content with partially encrypted portions merged from a partial encrypted content file to form a content output stream. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Turning now to FIG. 1, FIG. 1 is a block diagram an example of an implementation of a system 100 capable of providing on-demand download of partial encrypted content for partial super distributed content. A content rendering device 102 interconnects through a network 104 to at least one of a server_1 106 through a server_N 108.

As will be described in more detail below in association with FIG. 2 through FIG. 4, the content rendering device 102, via communication with one or more of the server_1 106 through the server_N 108, provides automated on-demand download of partial encrypted content for partial super distributed content. The automated on-demand download of partial encrypted content for partial super distributed content is based upon super distribution of portions of content, such as a partial super distributed content file, that is super distributed with certain portions of the content inaccessible (e.g., either not present on or omitted/missing from the distribution medium). The automated on-demand download of partial encrypted content for partial super distributed content may be performed, for example, in response to a request to render a particular partial super distributed content selection that has at least one portion of the content missing from the distribution medium or locally stored partial super distributed content file.

It should be noted that the content rendering device 102 may be a portable computing device, either by a user's ability to move the content rendering device 102 to different locations, or by the content rendering device 102's association with a portable platform, such as a plane, train, automobile, or other moving vehicle. It should also be noted that the content rendering device 102 may be any computing device capable of processing information as described above and in more detail below. For example, the content rendering device 102 may include devices such as a television, a set top box (STB), a personal computer (e.g., desktop, laptop, etc.) or a handheld device (e.g., cellular telephone, a personal digital assistant (PDA), tablet computer, E-book, email device, a video or music recording or playback device, etc.), or any other device capable of processing information as described in more detail below.

The network 104 may include any form of interconnection suitable for the intended purpose, including a private or public network such as an intranet or the Internet, respectively, a home network interconnection to another device or network, direct inter-module interconnection, dial-up, wireless, or any other interconnection mechanism capable of interconnecting the respective devices.

The server_1 106 through the server_N 108 may include any device capable of providing data for consumption by a device, such as the content rendering device 102, via a network, such as the network 104. As such, the server_1 106 through the server_N 108 may each include a web server or other data server device.

Figure 2:
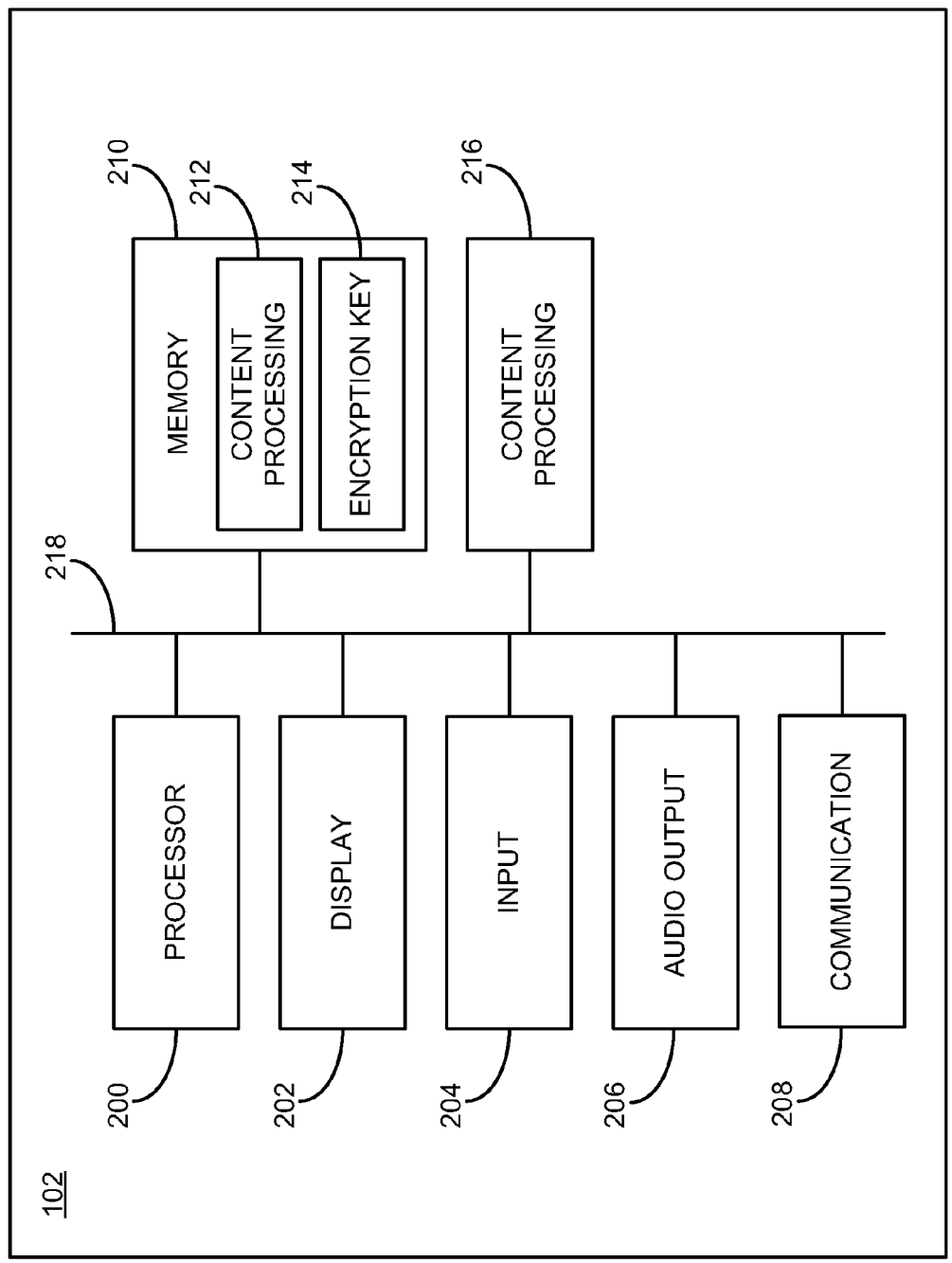
FIG. 2 is a block diagram of an example of an implementation of a content rendering device that provides automated on-demand download of partial encrypted content for partial super distributed content consistent with certain embodiments of the present invention.

FIG. 2 is a block diagram of an example of an implementation of the content rendering device 102 that provides automated on-demand download of partial encrypted content for partial super distributed content. A processor 200 provides computer instruction execution, computation, and other capabilities within the content rendering device 102. A display device 202 provides visual and/or other information to a user of the content rendering device 102. The display device 202 may include any type of display device, such as a cathode ray tube (CRT), liquid crystal display (LCD), light emitting diode (LED), electronic ink displays, projection or other display element or panel. An input device 204 provides input capabilities for the user. The input device 204 may include a mouse, pen, trackball, infrared input for a remote control (not shown), or other input device. One or more input devices, such as the input device 204, may be used.

An audio output device 206 provides audio output capabilities for the content rendering device 102. The audio output device 206 may include a speaker, driver circuitry, and interface circuitry as appropriate for a given implementation.

A communication module 208 provides communication capabilities for interaction with the content rendering device 102, such as for retrieval of partial super distributed content and partial encrypted portions of the partial super distributed content, as described above and in more detail below. It is understood that the retrieved content may include audio and/or video (A/V) content and may be retrieved via a satellite, cable, the Internet, or other content provider, and other activities as appropriate for a given implementation. The communication module 208 may support wired or wireless standards appropriate for a given implementation. Example wired standards include Internet video link (IVL) interconnection within a home network, for example, such as Sony Corporation's Bravia® Internet Video Link (BIVL™). Example wireless standards include cellular wireless communication and Bluetooth® wireless communication standards. Many other wired and wireless communication standards are possible and all are considered within the scope of the present subject matter.

A memory 210 includes a content processing storage area 212 that stores one or more partial super distributed content files and one or more partial encrypted content files for processing as described above and in more detail below for on-demand download of partial encrypted content for partial super distributed content. The content processing storage area 212 may also include buffer space and storage for merging the partial super distributed content with the partial encrypted content. An encryption key storage area 214 stores one or more encryption keys for use in decrypting the partial encrypted content. Additionally, as described above and in more detail below, the partial super distributed content may also be encrypted using a coverage key. In such an implementation, the encryption key storage area 214 may store a coverage encryption key for decrypting one or more coverage key encrypted portions of the partial super distributed content that are encrypted using the coverage key.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A content processing module 216 is also illustrated. The content processing module 216 provides on-demand processing of content for the content rendering device 102, as described above and in more detail below. The content processing module 216 implements the automated on-demand download of partial encrypted content for partial super distributed content of the content rendering device 102.

Though the content processing module 216 and the communication module 208 described above are illustrated as component-level modules for ease of illustration and description purposes, it should be noted that these modules may include any hardware, programmed processor(s), and memory used to carry out the functions of these modules as described above and in more detail below. For example, the content processing module 216 and the communication module 208 may include additional controller circuitry in the form of application specific integrated circuits (ASICs), processors, and/or discrete integrated circuits and components for performing communication and electrical control activities associated with the respective devices. Additionally, the content processing module 216 and the communication module 208 may also include interrupt-level, stack-level, and application-level modules as appropriate. Furthermore, the content processing module 216 and the communication module 208 may include any memory components used for storage, execution, and data processing for performing processing activities associated with these modules.

It should also be noted that the content processing module 216 may form a portion of other circuitry described without departure from the scope of the present subject matter. Further, the content processing module 216 may alternatively be implemented as an application stored within the memory 210. In such an implementation, the content processing module 216 may include instructions executed by the processor 200 for performing the functionality described herein. The processor 200 may execute these instructions to provide the processing capabilities described above and in more detail below for the content rendering device 102. The content processing module 216 may form a portion of an interrupt service routine (ISR), a portion of an operating system, a portion of a browser application, or a portion of a separate application without departure from the scope of the present subject matter.

The processor 200, the display device 202, the input device 204, the audio output device 206, the communication module 208, the memory 210, and content processing module 216 are interconnected via one or more interconnections shown as interconnection 218 for ease of illustration. The interconnection 218 may include a system bus, a network, or any other interconnection capable of providing the respective components with suitable interconnection for the respective purpose.

Furthermore, components within the content rendering device 102 may be co-located or distributed within a network without departure from the scope of the present subject matter. For example, the components within the content rendering device 102 may be located within a stand-alone device, such as a television, set top box (STB), personal computer (e.g., desktop or laptop) or handheld device (e.g., cellular telephone, personal digital assistant (PDA), email device, music recording or playback device, etc.). For a distributed arrangement, the display device 202 and the input device 204 may be located at a kiosk, while the processor 200 and memory 210 may be located at a local or remote server. Many other possible arrangements for the components of the content rendering device 102 are possible and all are considered within the scope of the present subject matter.

Figure 3:
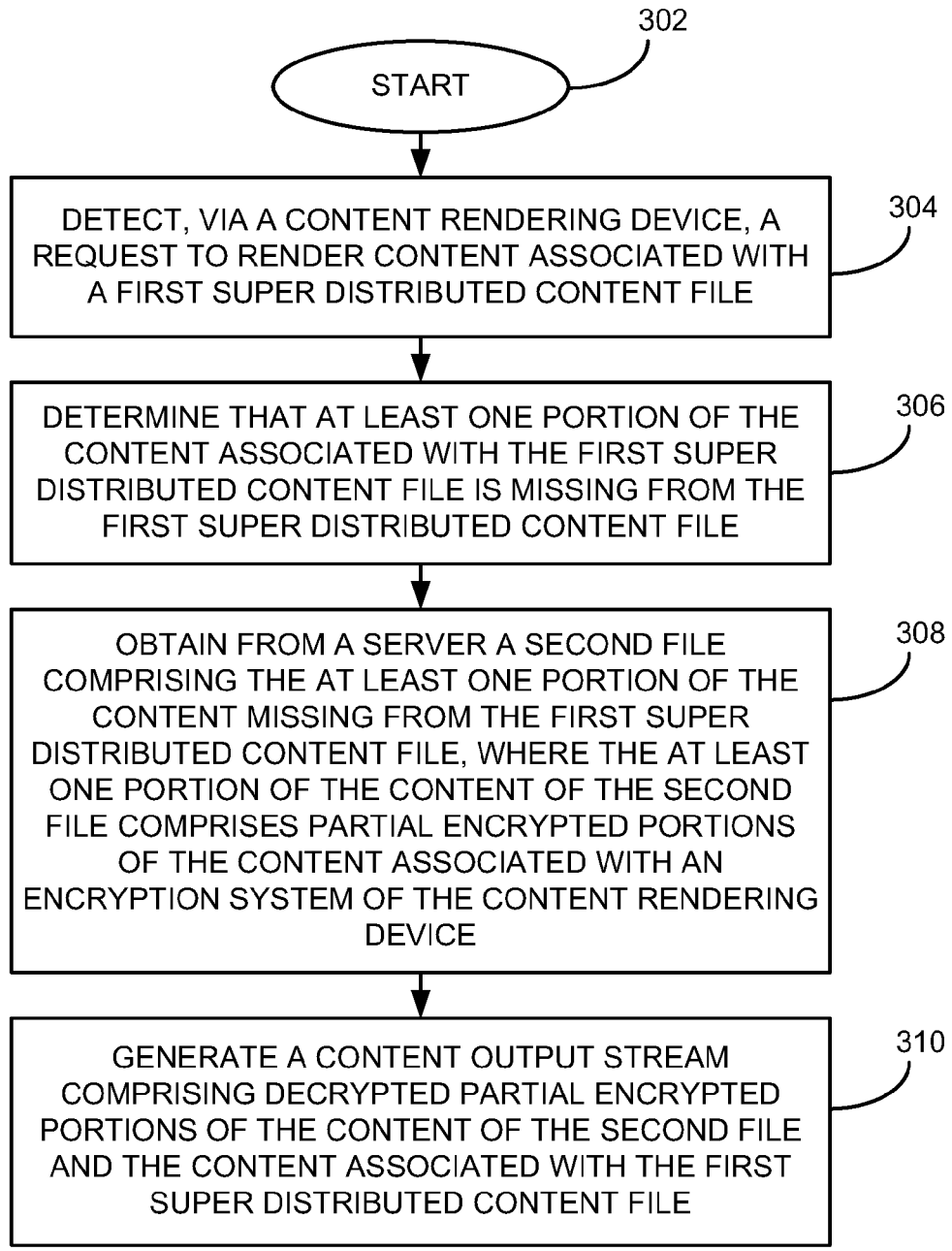
FIG. 3 is a flow chart of an example of an implementation of a process that provides automated on-demand download of partial encrypted content for partial super distributed content consistent with certain embodiments of the present invention.

FIG. 3 through FIG. 4 below describe example processes that may be executed by devices, such as the content rendering device 102, to perform the automated on-demand download of partial encrypted content for partial super distributed content associated with the present subject matter. Many other variations on the example processes are possible and all are considered within the scope of the present subject matter. The example processes may be performed by modules, such as the content processing module 216 and/or executed by the processor 200, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 that provides automated on-demand download of partial encrypted content for partial super distributed content. The process 300 starts at 302. At block 304, the process 300 detects, via a content rendering device, a request to render content associated with a first super distributed content file. At block 306, the process 300 determines that at least one portion of the content associated with the first super distributed content file is missing from the first super distributed content file. At block 308, the process 300 obtains from a server a second file comprising the at least one portion of the content missing from the first super distributed content file, where the at least one portion of the content of the second file comprises partial encrypted portions of the content associated with an encryption system of the content rendering device. At block 310, the process 300 generates a content output stream comprising decrypted partial encrypted portions of the content of the second file and the content associated with the first super distributed content file.

Figure 4A:
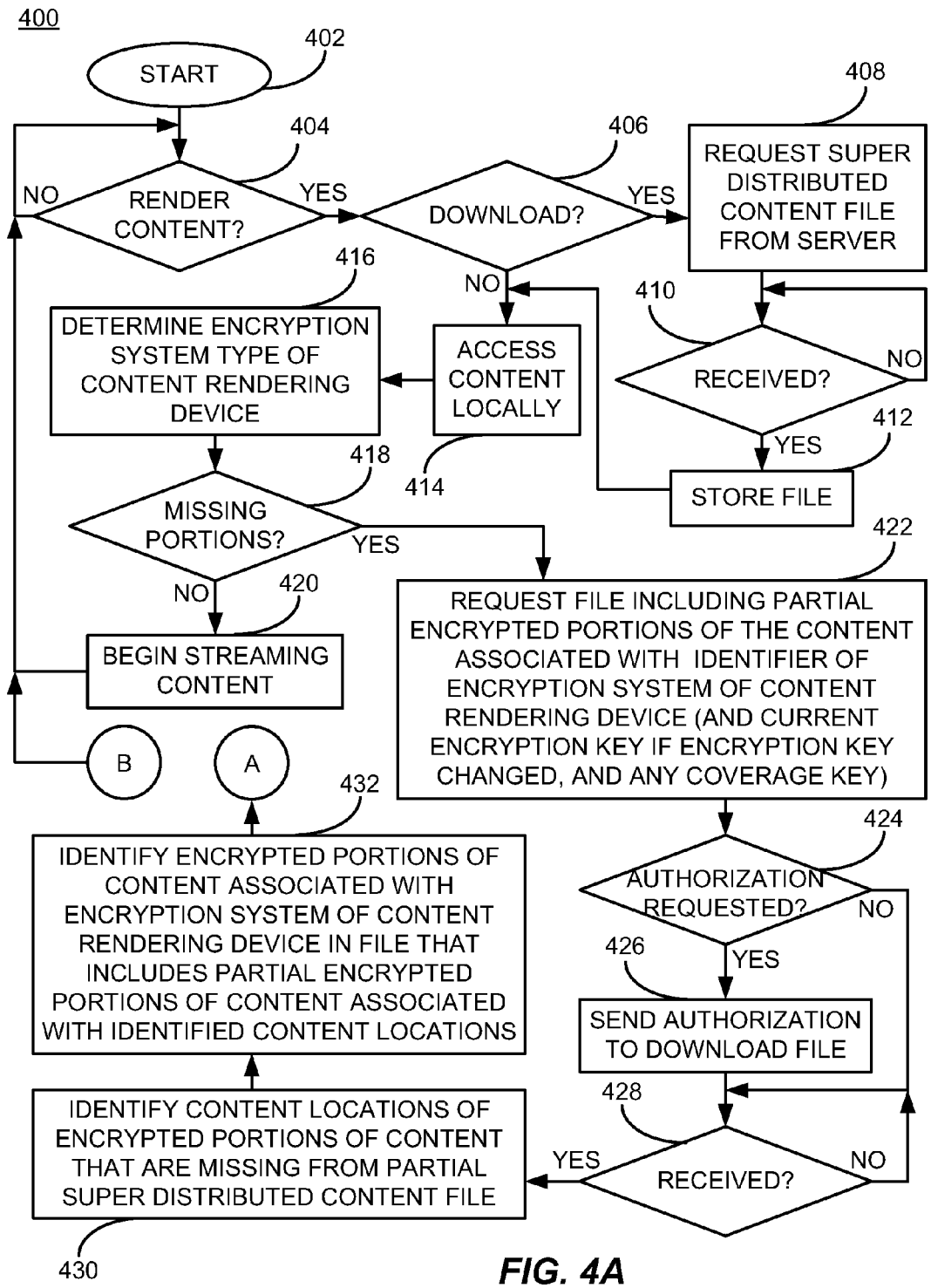
FIG. 4A is a flow chart of an example of an implementation of initial processing within a process for automated on-demand download of partial encrypted content for partial super distributed content consistent with certain embodiments of the present invention.
Figure 4B:
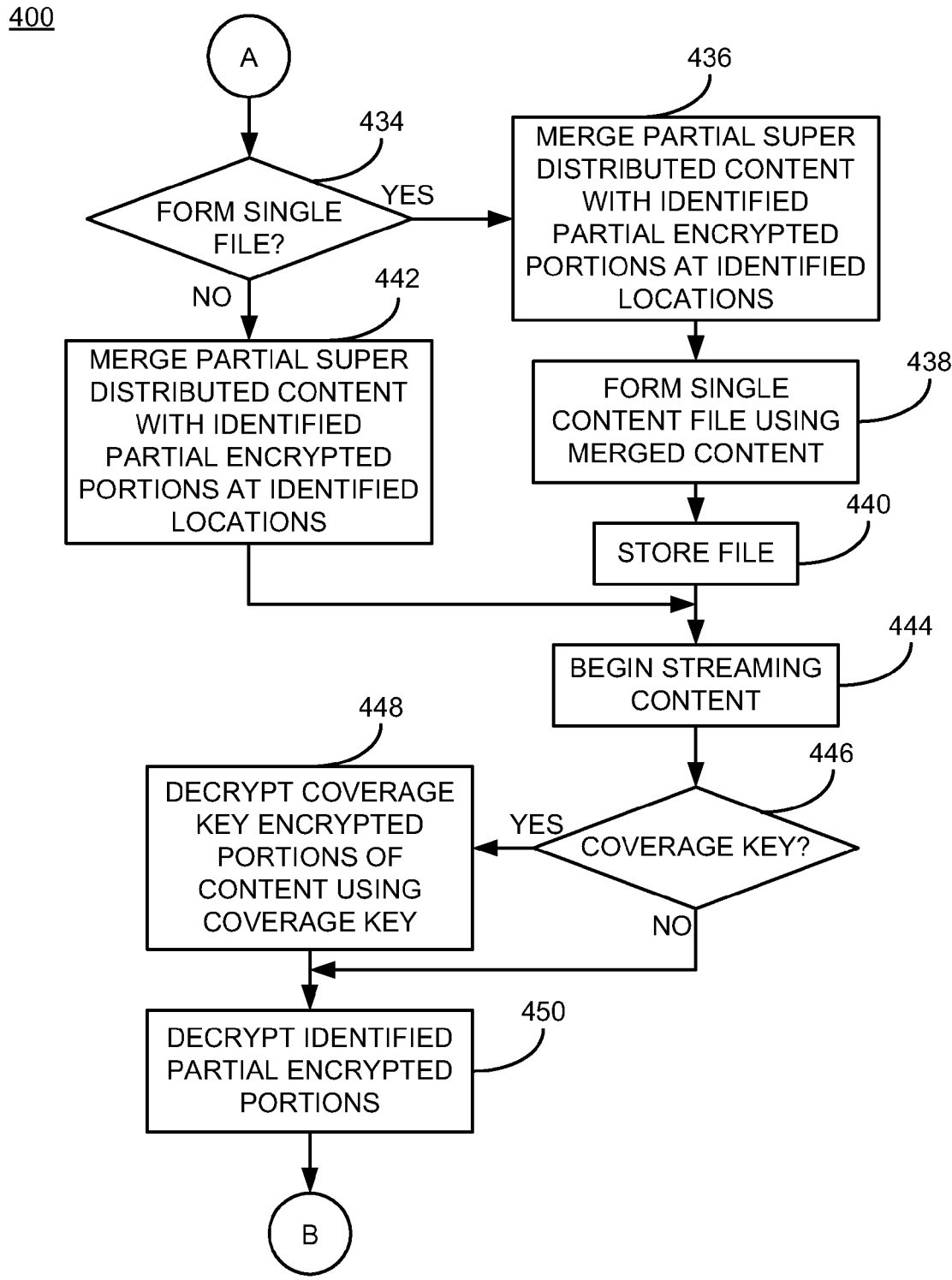
FIG. 4B is a flow chart of an example of an implementation of additional processing within a process for automated on-demand download of partial encrypted content for partial super distributed content consistent with certain embodiments of the present invention.

FIGS. 4A-4B is a flow chart of an example of an implementation of a process 400 for automated on-demand download of partial encrypted content for partial super distributed content. For purposes of the present example, the process 400 may render both normal super distributed content files that include all content portions and partial super distributed content files as described herein. FIG. 4A illustrates initial processing within the process 400. The process 400 starts at 402. At decision point 404, the process 400 makes a determination as to whether a request to render content associated with a super distributed content file has been detected. The request to render the content associated with the super distributed content file may include a request to download the super distributed content file from a content access server, such as one of the server_1 106 through the server_N 108. Alternatively, the request the render the content associated with the partial super distributed content file may include a request to render a super distributed content file stored on one of a package medium, a portable memory storage medium, a preloaded storage medium accessible, or other medium via the content rendering device 102.

In response to determining that a request to render content associated with a super distributed content file has been detected, the process 400 makes a determination at decision point 406 as to whether the request is a request to download the super distributed content file or a request to access the super distributed content file via a locally-accessible medium associated with the content rendering device 102. In response to determining that the request to render the content associated with the super distributed content file is a request to download the super distributed content file, the process 400 requests the super distributed content file from a server at block 408. At decision point 410, the process 400 makes a determination as to whether the super distributed content file has been received. In response to a determination that the super distributed content file has been received, the process 400 stores the super distributed content file, such as within the content processing storage area 212 of the memory 210, at block 412.

In response the storing the super distributed content file at block 412, or in response to determining that the request to render the content associated with the super distributed content file is a request to access the content via a locally-accessible medium associated with the content rendering device 102, the process 400 accesses either the downloaded and locally stored content or the content that was previously locally-accessible at block 414. At block 416, the process 400 determines an encryption system type of the content rendering device. For purposes of the present description, an encryption system type may include an encryption key associated with an encryption system that allows the encryption key to be changed over time or a particular encryption system with a fixed encryption key.

At decision point 418, the process 400 makes a determination as to whether at least one portion of the content associated with the super distributed content file is missing from the super distributed content file (e.g., omitted). For purposes of the present example, where a determination is made that at least one portion of the content associated with the super distributed content file is missing, a determination is also made that the super distributed content file is a "partial" super distributed content file, as described above and in more detail below.

In response to determining that no portions of the content are missing from the super distributed content file (e.g., the file is not a partial super distributed content file), the process 400 begins streaming the content at block 420 and returns to decision point 404 to determine whether a request to render different content has been detected. It is understood that additional processing to determine whether a request to stop streaming content has been received has been omitted for brevity.

Returning to the description of decision point 418, in response to determining that at least one portion of the content associated with the super distributed content file is missing and that the file is a partial super distributed content file, the process 400 requests an additional file that includes the partial encrypted portions of the content from a server using an identifier of the encryption system of the content rendering device at block 422. It is also understood that, for implementations where an encryption key changes over time, a current encryption key may also be requested at block 422 if the encryption key has changed. Additionally, where the at least one portion of the content within the partial super distributed content file is encrypted using a coverage key, that coverage key may also be requested at block 422, if not already accessible by the content rendering device 102. It is further understood that either the encryption key used to decrypt the encrypted portions of the content or the coverage key may include an encryption key with a valid duration of time that expires after expiration of the valid duration of time.

At decision point 424, the process 400 makes a determination as to whether an authorization has been requested for download of the partial encrypted portions of the content. An authorization may be requested, for example in association with a purchase transaction, a rental transaction, a lease transaction, or some other form of transaction associated with access to the content. It should be noted that accounts may be established in association with any such transaction and that billing and other arrangements may be associated with such accounts. Details of such accounting matters are omitted from the description herein for brevity, but it is understood that such aspects are considered within the scope of the present subject matter.

In response to determining at decision point 424 that an authorization has been requested for download of the partial encrypted portions of the content, the process 400 sends an authorization to download the file that includes the partial encrypted portions of the content at block 426. The server may validate the authorization against a user account and billing authorization information prior to responding with the requested file that includes the partial encrypted portions of the content. In response to either sending the authorization to download the requested file that includes the partial encrypted portions of the content to the server at block 426, or in response to determining that an authorization to download the file has not been requested at decision point 424, the process 400 makes a determination at decision point 428 as to whether the requested file, including the partial encrypted portions of the content, has been received.

In response to receiving the file including the partial encrypted portions of the content, either in response to validation of the authorization by the server, or for implementations where no authorization has been requested, the process 400 identifies content locations of the encrypted portions of the content that are missing from the partial super distributed content file at block 430. At block 432, the process 400 identifies encrypted portions of the content associated with the encryption system of the content rendering device within the file that includes the partial encrypted portions of the content associated with the identified content locations. For purposes of the present example, as described above, it is understood that the file that includes the partial encrypted portions of the content may include multiple partial encrypted portions of the content and that the processing at block 432 may include identifying the partial encrypted portions of the content associated with the encryption system of the content rendering device among the multiple partial encrypted portions within that file. The process 400 transitions to the processing shown and described in association with FIG. 4B.

FIG. 4B illustrates additional processing associated with the process 400 for automated on-demand download of partial encrypted content for partial super distributed content. At decision point 434, the process 400 makes a determination as to whether to form (i.e., merge) the content for rendering into a single file using the partial super distributed content file and the downloaded file that includes the partial encrypted portions of the content associated with the encryption system of the content rendering device 102. Multiple options exist for merging content for rendering in association with the present subject matter. Where a single file is formed, the identified partial encrypted content portions may be interleaved into the appropriate identified locations within the partial super distributed content either within the partial super distributed content file or within a new file. Further, formation of the single file may be performed in real time in association with beginning to render the content. Alternatively, the content may be merged in real time with the encrypted portions of the content decrypted "on the fly" (e.g., dynamically as needed) to form a content output stream without forming a single file. Many other variations on the processing described are possible and all are considered within the scope of the present subject matter.

In response to determining at decision point 434 to form a single file, the process 400 merges the partial super distributed content with the identified partial encrypted portions at the identified locations at block 436. It is understood that merging the partial super distributed content with the identified partial encrypted portions into the single file without decrypting the encrypted portions may preserve security for certain implementations. At block 438, the process 400 forms the single content file using the merged content. At block 440, the process 400 stores the merged file.

Returning to the description of decision point 434, in response to determining not to form a single file, the process 400 merges the partial super distributed content with the identified partial encrypted portions of content at the identified locations at block 442. In response to merging the partial super distributed content with the encrypted portions at the identified locations at block 442, or in response to storing the single file that includes the merged content at block 440, the process 400 begins streaming the content at block 444.

At decision point 446, the process 400 makes a determination as to whether at least one portion of the content originally associated with the partial super distributed content file is encrypted using a coverage key. For purposes of the present example, it is understood that these portions may be portions other than the partial (or multiple partial) encrypted portions of the content associated with the encryption system of the content rendering device that are missing from the partial super distributed content file. It is further understood that, as described above, that one or more of these portions of content associated with the partial super distributed content file may be encrypted using a coverage key accessible by the content rendering device 102.

In response to determining at decision point 446 that at least one portion of the content originally associated with the partial super distributed content file is encrypted using a coverage key, the process 400 begins decrypting coverage-key encrypted portions of the content using the coverage key at block 448. In response to determining a decision point 446 that the portions of the content originally associated with the partial super distributed content file are not encrypted using a coverage key, or in response to beginning decryption of portions of the content that are encrypted using a coverage key at block 448, the process 400 begins decrypting the identified partial encrypted portions of the content that were merged with the partial super distributed content file at block 450. For purposes of the present example, it is understood that decryption of the identified partial encrypted portions of the content may be performed using a downloaded encryption key or an encryption key resident within or otherwise associated with the content rendering device 102. It is further understood that the coverage key may be obtained from a server, as described above. It is also understood that decryption may continue in association with generation of the content output stream until all of the content has been rendered or until some other event occurs (e.g., a request to stop generation or a request to render another content selection). The process 400 then returns to the processing described above in association with FIG. 4A at decision point 404 and iterates as described above for additional content rendering requests.

As such, the process 400 processes requests for partial super distributed content that may be either downloaded from a content server, such as content stored within a storage device associated with a server, or partial super distributed content associated with a package medium or portable memory storage medium that may alternatively be preloaded with the super distributed content. The process 400 determines an encryption system type of the content rendering device 102 and requests a partial encrypted content file that includes partial encrypted portions of the content encrypted using an encryption system associated with the determined encryption system type of the content rendering device in association with a download request. Authorization and billing information may be processed. The partial super distributed content file and the downloaded partial encrypted content file may be merged dynamically or into a file for rendering via a generated content output stream. As such, the content may be rendered on demand, including on demand download and decryption of partial encrypted portions of the content, and decryption of any portions of the partial super distributed content that may be encrypted using a coverage key. Many other variations on the processing described above are possible and all are considered within the scope of the present subject matter.

Thus, in accord with certain implementations, a method of combining partial super distributed content with partially encrypted portions on demand involves detecting, via a content rendering device, a request to render content associated with a first super distributed content file; determining that at least one portion of the content associated with the first super distributed content file is missing from the first super distributed content file; determining an encryption system of the content rendering device; requesting a second file including the at least one portion of the content missing from the first super distributed content file from a server using an identifier of the encryption system of the content rendering device including an authorization to download the second file; receiving the second file from the server in response to validation of the authorization by the server, where the received second file includes partial encrypted portions of the content associated with the encryption system of the content rendering device; identifying content locations of the at least one portion of the content missing from the first super distributed content file; identifying the partial encrypted portions of the content associated with the encryption system of the content rendering device of the second file that are associated with the identified content locations; placing within a content output stream the identified partial encrypted portions at the identified content locations associated with the at least one portion of the content missing from the first super distributed content file; decrypting the identified partial encrypted portions of the content associated with the encryption system of the content rendering device; and generating the content output stream including the decrypted partial encrypted portions of the content of the second file and the content associated with the first super distributed content file.

In certain implementations, the method of combining partial super distributed content with partially encrypted portions on demand involves detecting, via a content rendering device, a request to render content associated with a first super distributed content file; determining that at least one portion of the content associated with the first super distributed content file is missing from the first super distributed content file; obtaining from a server a second file including the at least one portion of the content missing from the first super distributed content file, where the at least one portion of the content of the second file includes partial encrypted portions of the content associated with an encryption system of the content rendering device; and generating a content output stream including decrypted partial encrypted portions of the content of the second file and the content associated with the first super distributed content file.

In certain implementations, the request to render the content associated with the first super distributed content file includes a request to download the content from a content access server. In certain implementations, the method of combining partial super distributed content with partially encrypted portions on demand involving obtaining from the server the second file including the at least one portion of the content missing from the first super distributed content file involves determining the encryption system of the content rendering device; requesting the second file from the server using an identifier of the encryption system of the content rendering device; and receiving the second file from the server, where the received second file includes the partial encrypted portions of the content encrypted using the encryption system of the content rendering device. In certain implementations, the method of obtaining from the server the second file including the at least one portion of the content missing from the first super distributed content file involves sending an authorization to download the second file to the server; and receiving the second file in response to validation of the authorization by the server. In certain implementations, the method of sending the authorization to download the second file to the server involves sending the authorization as part of a content access transaction for one of a purchase of the content, a rental of the content, and a lease of the content. In certain implementations, the method of generating the content output stream including the decrypted partial encrypted portions of the content of the second file and the content associated with the first super distributed content file involves merging the content associated with the first super distributed content file with the partial encrypted portions of the content of the second file; and decrypting the partial encrypted portions of the content associated with the encryption system of the content rendering device. In certain implementations, the method of merging the content associated with the first super distributed content file with the partial encrypted portions of the content of the second file involves identifying content locations of the at least one portion of the content missing from the first super distributed content file; identifying the partial encrypted portions of the content associated with the encryption system of the content rendering device of the second file that are associated with the identified content locations; and placing within the content output stream the identified partial encrypted portions at the identified content locations associated with the at least one portion of the content missing from the first super distributed content file. In certain implementations, the method of generating the content output stream including the decrypted partial encrypted portions of the content of the second file and the content associated with the first super distributed content file involves merging the content associated with the first super distributed content file with the partial encrypted portions of the content within the second file obtained from the server; forming a single content file using the merged content; and generating the content output stream using the single content file by decrypting the partial encrypted portions of the content on demand as the content is rendered via the content rendering device. In certain implementations, the method further involves downloading an encryption key associated with the encryption system of the content rendering device; and the method of generating the content output stream including decrypted partial encrypted portions of the content of the second file and the content associated with the first super distributed content file involves decrypting the partial encrypted portions of the content of the second file using the downloaded encryption key. In certain implementations, the downloaded encryption key includes an encryption key with a valid duration that expires after the valid duration. In certain implementations, the content associated with the first super distributed content file includes at least one portion of the content, other than the partial encrypted portions of the content associated with the encryption system of the content rendering device that are missing from the first super distributed content file, that is encrypted using a coverage key accessible via the content rendering device, and the method further involves decrypting the at least one portion of the content encrypted using the coverage key. In certain implementations, the method further involves obtaining the coverage key from the server. In certain implementations, the first super distributed content file includes a content file stored on one of a package medium accessible via the content rendering device; a portable memory storage medium accessible via the content rendering device; a preloaded storage medium accessible via the content rendering device; and a storage device associated with the server, where the first super distributed content file is downloaded from the server. In certain implementations, the second file includes partial encrypted portions of the content encrypted using a plurality of encryption types that change over time, and the method further involves obtaining a current encryption key associated with a current one of the plurality of encryption types.

In another implementation, a computer readable storage medium may store instructions which, when executed on one or more programmed processors, carry out a process of combining partial super distributed content with partially encrypted portions on demand involving detecting, via a content rendering device, a request to render content associated with a first super distributed content file; determining that at least one portion of the content associated with the first super distributed content file is missing from the first super distributed content file; obtaining from a server a second file including the at least one portion of the content missing from the first super distributed content file, where the at least one portion of the content of the second file includes partial encrypted portions of the content associated with an encryption system of the content rendering device; and generating a content output stream including decrypted partial encrypted portions of the content of the second file and the content associated with the first super distributed content file.

An apparatus for combining partial super distributed content with partially encrypted portions on demand, consistent with certain implementations, has a memory that stores a first super distributed content file and a processor programmed to detect a request to render content associated with the first super distributed content file stored within the memory; determine that at least one portion of the content associated with the first super distributed content file is missing from the first super distributed content file; obtain from a server a second file including the at least one portion of the content missing from the first super distributed content file, where the at least one portion of the content of the second file includes partial encrypted portions of the content associated with an encryption system of the apparatus; and generate a content output stream including decrypted partial encrypted portions of the content of the second file and the content associated with the first super distributed content file.

In certain implementations, the request to render the content associated with the first super distributed content file includes a request to download the content from a content access server. In certain implementations, in being programmed to obtain from the server the second file including the at least one portion of the content missing from the first super distributed content file, the processor is programmed to determine the encryption system of the apparatus; request the second file from the server using an identifier of the encryption system of the apparatus; and receive the second file from the server, where the received second file includes the partial encrypted portions of the content encrypted using the encryption system of the apparatus. In certain implementations, in being programmed to obtain from the server the second file including the at least one portion of the content missing from the first super distributed content file, the processor is programmed to send an authorization to download the second file to the server; and receive the second file in response to validation of the authorization by the server. In certain implementations, in being programmed to send the authorization to download the second file to the server, the processor is programmed to send the authorization as part of a content access transaction for one of a purchase of the content, a rental of the content, and a lease of the content. In certain implementations, in being programmed to generate the content output stream including the decrypted partial encrypted portions of the content of the second file and the content associated with the first super distributed content file, the processor is programmed to merge the content associated with the first super distributed content file with the partial encrypted portions of the content of the second file; and decrypt the partial encrypted portions of the content associated with the encryption system of the apparatus. In certain implementations, in being programmed to merge the content associated with the first super distributed content file with the partial encrypted portions of the content of the second file, the processor is programmed to identify content locations of the at least one portion of the content missing from the first super distributed content file; identify the partial encrypted portions of the content associated with the encryption system of the apparatus of the second file that are associated with the identified content locations; and place within the content output stream the identified partial encrypted portions at the identified content locations associated with the at least one portion of the content missing from the first super distributed content file. In certain implementations, in being programmed to generate the content output stream including the decrypted partial encrypted portions of the content of the second file and the content associated with the first super distributed content file, the processor is programmed to merge the content associated with the first super distributed content file with the partial encrypted portions of the content within the second file obtained from the server; form a single content file using the merged content; and generate the content output stream using the single content file by decrypting the partial encrypted portions of the content on demand as the content is rendered via the apparatus. In certain implementations, the processor is further programmed to download an encryption key associated with the encryption system of the apparatus; and where, in being programmed to generate the content output stream including decrypted partial encrypted portions of the content of the second file and the content associated with the first super distributed content file, the processor is programmed to decrypt the partial encrypted portions of the content of the second file using the downloaded encryption key. In certain implementations, the downloaded encryption key includes an encryption key with a valid duration that expires after the valid duration. In certain implementations, the content associated with the first super distributed content file includes at least one portion of the content, other than the partial encrypted portions of the content associated with the encryption system of the apparatus that are missing from the first super distributed content file, that is encrypted using a coverage key accessible via the apparatus, and the processor is further programmed to decrypt the at least one portion of the content encrypted using the coverage key. In certain implementations, the processor is further programmed to obtain the coverage key from the server. In certain implementations, the first super distributed content file includes a content file stored on one of a package medium accessible via the apparatus; a portable memory storage medium accessible via the apparatus; a preloaded storage medium accessible via the apparatus; and a storage device associated with the server, where the first super distributed content file is downloaded from the server. In certain implementations, the second file includes partial encrypted portions of the content encrypted using a plurality of encryption types that change over time, and the processor is further programmed to obtain a current encryption key associated with a current one of the plurality of encryption types.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of combining partial super distributed content with partially encrypted portions on demand, comprising:

receiving a first super distributed partial content file that is distributed with at least one portion missing;

detecting, via a content rendering device, a request to render content associated with the first super distributed partial content file;

where the request to render the content associated with the first super distributed partial content file comprises a request to download content from a content access server;

determining at the content rendering device that the at least one portion of the content associated with the first super distributed partial content file is missing from the first super distributed partial content file;

determining an encryption system of the content rendering device;

requesting a second file comprising the at least one portion of the content missing from the first super distributed partial content file from the content access server using an identifier of the encryption system of the content rendering device comprising an authorization to download the second file;

receiving the second file from the content access server in response to validation of the authorization by the content access server, where the received second file comprises partial encrypted portions of the content associated with the encryption system of the content rendering device;

identifying content locations of the at least one portion of the content missing from the first super distributed partial content file;

identifying the partial encrypted portions of the content associated with the encryption system of the content rendering device of the second file that are associated with the identified content locations;

placing within a content output stream the identified partial encrypted portions at the identified content locations associated with the at least one portion of the content missing from the first super distributed partial content file;

decrypting the identified partial encrypted portions of the content associated with the encryption system of the content rendering device; and generating a content output stream comprising the decrypted partial encrypted portions of the content of the second file and the content associated with the first super distributed partial content file.

2. The method according to claim 1, where receiving the second file comprising the at least one portion of the content missing from the first super distributed partial content file comprises:

sending an authorization to download the second file to the content access server; and receiving the second file in response to validation of the authorization by the content access server.

3. The method according to claim 2, where sending the authorization to download the second file to the content access server comprises sending the authorization as part of a content access transaction for one of a purchase of the content, a rental of the content, and a lease of the content.

4. The method according to claim 3, where the content associated with the first super distributed partial content file comprises at least one portion of the content, other than the partial encrypted portions of the content associated with the encryption system of the content rendering device that are missing from the first super distributed partial content file, that is encrypted using a coverage key accessible via the content rendering device, and further comprising decrypting the at least one portion of the content encrypted using the coverage key.

5. The method according to claim 1, where generating the content output stream comprising the decrypted partial encrypted portions of the content of the second file and the content associated with the first super distributed partial content file comprises:

merging the content associated with the first super distributed partial content file with the partial encrypted portions of the content of the second file; and decrypting the partial encrypted portions of the content associated with the encryption system of the content rendering device.

6. The method according to claim 5, where merging the content associated with the first super distributed partial content file with the partial encrypted portions of the content of the second file comprises:

identifying content locations of the at least one portion of the content missing from the first super distributed partial content file;

identifying the partial encrypted portions of the content associated with the encryption system of the content rendering device of the second file that are associated with the identified content locations; and placing within the content output stream the identified partial encrypted portions at the identified content locations associated with the at least one portion of the content missing from the first super distributed partial content file.

7. The method according to claim 1, where generating the content output stream comprising the decrypted partial encrypted portions of the content of the second file and the content associated with the first super distributed partial content file comprises:

merging the content associated with the first super distributed partial content file with the partial encrypted portions of the content within the second file obtained from the content access server;

forming a single content file using the merged content; and generating the content output stream using the single content file by decrypting the partial encrypted portions of the content on demand as the content is rendered via the content rendering device.

8. The method according to claim 1, further comprising:

downloading an encryption key associated with the encryption system of the content rendering device; and where generating the content output stream comprising decrypted partial encrypted portions of the content of the second file and the content associated with the first super distributed partial content file comprises decrypting the partial encrypted portions of the content of the second file using the downloaded encryption key.

9. The method according to claim 8, where the downloaded encryption key comprises an encryption key with a valid duration that expires after the valid duration.

10. The method according to claim 1, where the content associated with the first super distributed partial content file comprises at least one portion of the content, other than the partial encrypted portions of the content associated with the encryption system of the content rendering device that are missing from the first super distributed partial content file, that is encrypted using a coverage key accessible via the content rendering device, and further comprising decrypting the at least one portion of the content encrypted using the coverage key.

11. The method according to claim 10, further comprising obtaining the coverage key from the content access server.

12. The method according to claim 1, where the first super distributed partial content file comprises a content file stored on one of:
- a package medium accessible via the content rendering device;
- a portable memory storage medium accessible via the content rendering device;
- a preloaded storage medium accessible via the content rendering device; and
- a storage device associated with the content access server, where the first super distributed partial content file is downloaded from the content access server.

13. The method according to claim 1, where the second file comprises partial encrypted portions of the content encrypted using a plurality of encryption types that change over time, and further comprising obtaining a current encryption key associated with a current one of the plurality of encryption types.

14. A non-transitory computer readable storage medium storing instructions which, when executed on one or more programmed processors, carry out a method of combining partial super distributed content with partially encrypted portions on demand, comprising:
- receiving a first super distributed partial content file that is distributed with at least one portion missing;
- detecting, via a content rendering device, a request to render content associated with the first super distributed partial content file;
- where the request to render the content associated with the first super distributed partial content file comprises a request to download content from a content access server;
- determining at the content rendering device that the at least one portion of the content associated with the first super distributed partial content file is missing from the first super distributed partial content file;
- determining an encryption system of the content rendering device;
- requesting a second file comprising the at least one portion of the content missing from the first super distributed partial content file from the content access server using an identifier of the encryption system of the content rendering device comprising an authorization to download the second file;
- receiving the second file from the content access server in response to validation of the authorization by the content access server, where the received second file comprises partial encrypted portions of the content associated with the encryption system of the content rendering device;
- identifying content locations of the at least one portion of the content missing from the first super distributed partial content file;
- identifying the partial encrypted portions of the content associated with the encryption system of the content rendering device of the second file that are associated with the identified content locations;
- placing within a content output stream the identified partial encrypted portions at the identified content locations associated with the at least one portion of the content missing from the first super distributed partial content file;
- decrypting the identified partial encrypted portions of the content associated with the encryption system of the content rendering device; and
- generating a content output stream comprising decrypted partial encrypted portions of the content of the second file and the content associated with the first super distributed partial content file.

15. The non-transitory computer readable storage medium according to claim 14, where the content associated with the first super distributed partial content file comprises at least one portion of the content, other than the partial encrypted portions of the content associated with the encryption system of the content rendering device that are missing from the first super distributed partial content file, that is encrypted using a coverage key accessible via the content rendering device, and further comprising decrypting the at least one portion of the content encrypted using the coverage key.

16. An apparatus for combining partial super distributed content with partially encrypted portions on demand, comprising:
- a memory that stores a first super distributed partial content file that is distributed with at least one portion missing; and
- a hardware processor programmed to:
  - detect a request to render content associated with the first super distributed partial content file stored within the memory;
  - where the request to render the content associated with the first super distributed partial content file comprises a request to download content from a content access server;
  - determine that at least one portion of the content associated with the first super distributed partial content file is missing from the first super distributed partial content file;
  - determine an encryption system of the content rendering device;
  - request a second file comprising the at least one portion of the content missing from the first super distributed partial content file from the content access server using an identifier of the encryption system of the content rendering device comprising an authorization to download the second file;
  - receive the second file from the content access server in response to validation of the authorization by the content access server, where the received second file comprises partial encrypted portions of the content associated with the encryption system of the content rendering device;
  - identify content locations of the at least one portion of the content missing from the first super distributed partial content file;
  - identify the partial encrypted portions of the content associated with the encryption system of the content rendering device of the second file that are associated with the identified content locations;
  - place within a content output stream the identified partial encrypted portions at the identified content locations associated with the at least one portion of the content missing from the first super distributed partial content file;
  - decrypt the identified partial encrypted portions of the content associated with the encryption system of the content rendering device; and
  - generate a content output stream comprising decrypted partial encrypted portions of the content of the second file and the content associated with the first super distributed partial content file.

17. The apparatus according to claim 16, where, in being programmed to receive the second file from the content access server, the processor is programmed to:
- send an authorization to download the second file to the content access server; and
- receive the second file in response to validation of the authorization by the content access server.

18. The apparatus according to claim 17, where, in being programmed to send the authorization to download the second file to the content access server, the processor is programmed to send the authorization as part of a content access transaction for one of a purchase of the content, a rental of the content, and a lease of the content.

19. The apparatus according to claim 17, where the content associated with the first super distributed partial content file comprises at least one portion of the content, other than the partial encrypted portions of the content associated with the encryption system of the content rendering device that are missing from the first super distributed partial content file, that is encrypted using a coverage key accessible via the apparatus, and where the processor is further programmed to decrypt the at least one portion of thr content encrypted using the coverge key.

20. The apparatus according to claim 16, where, in being programmed to generate the content output stream comprising the decrypted partial encrypted portions of the content of the second file and the content associated with the first super distributed partial content file, the processor is programmed to:
- merge the content associated with the first super distributed content file with the partial encrypted portions of the content of the second file; and
- decrypt the partial encrypted portions of the content associated with the encryption system of the apparatus.

21. The apparatus according to claim 20, where, in being programmed to merge the content associated with the first super distributed content file with the partial encrypted portions of the content of the second file, the processor is programmed to:
- identify content locations of the at least one portion of the content missing from the first super distributed content file;
- identify the partial encrypted portions of the content associated with the encryption system of the apparatus of the second file that are associated with the identified content locations; and
- place within the content output stream the identified partial encrypted portions at the identified content locations associated with the at least one portion of the content missing from the first super distributed content file.

22. The apparatus according to claim 16, where, in being programmed to generate the content output stream comprising the decrypted partial encrypted portions of the content of the second file and the content associated with the first super distributed partial content file, the processor is programmed to:
- merge the content associated with the first super distributed content file with the partial encrypted portions of the content within the second file obtained from the server;
- form a single content file using the merged content; and
- generate the content output stream using the single content file by decrypting the partial encrypted portions of the content on demand as the content is rendered via the apparatus.

23. The apparatus according to claim 16, where the processor is Further programmed to:
- download an encryption key associated with the encryption system of the apparatus; and
- where, in being programmed to generate the content output stream comprising decrypted partial encrypted portions of the content of the second file and the content associated with the first super distributed content file, the processor is programmed to decrypt the partial encrypted portions of the content of the second file using the downloaded encryption key.

24. The apparatus according to claim 23, where the downloaded encryption key comprises an encryption key with a valid duration that expires after the valid duration.

25. The apparatus according to claim 17, where the content associated with the first super distributed content file comprises at least one portion of the content, other than the partial encrypted portions of the content associated with the encryption system of the apparatus that are missing from the first super distributed content file, that is encrypted using a coverage key accessible via the apparatus, and where the processor is further programmed to decrypt the at least one portion of the content encrypted using the coverage key.

26. The apparatus according to claim 25, where the processor is further programmed to obtain the coverage key from the content access server.

27. The apparatus according to claim 16, where the first super distributed partial content file comprises a content file stored on one of:
- a package medium accessible via the apparatus;
- a portable memory storage medium accessible via the apparatus;
- a preloaded storage medium accessible via the apparatus; and
- a storage device associated with the server, where the first super distributed partial content file is downloaded from the server.

28. The apparatus according to claim 16, where the second file comprises partial encrypted portions of the content encrypted using a plurality of encryption types that change over time, and where the processor is further programmed to obtain a current encryption key associated with a current one of the plurality of encryption types.

* * * * *